No. 619,838. Patented Feb. 21, 1899.
Z. F. POTTER.
FILTER.
(Application filed July 26, 1897. Renewed Jan. 20, 1899.)
(No Model.) 3 Sheets—Sheet 1.

Witnesses
James F. Duhamel
Victor J. Evans

Inventor,
ZOROASTER F. POTTER,
by John Wedderburn
Attorney

No. 619,838. Patented Feb. 21, 1899.
Z. F. POTTER.
FILTER.
(Application filed July 26, 1897. Renewed Jan. 20, 1899.)

(No Model.) 3 Sheets—Sheet 2.

Witnesses
James F. Duhamel
Victor J. Evans

Inventor,
ZOROASTER F. POTTER,
by John Wedderburn
Attorney

No. 619,838. Patented Feb. 21, 1899.
Z. F. POTTER.
FILTER.
(Application filed July 26, 1897. Renewed Jan. 20, 1899.)
(No Model.) 3 Sheets—Sheet 3.
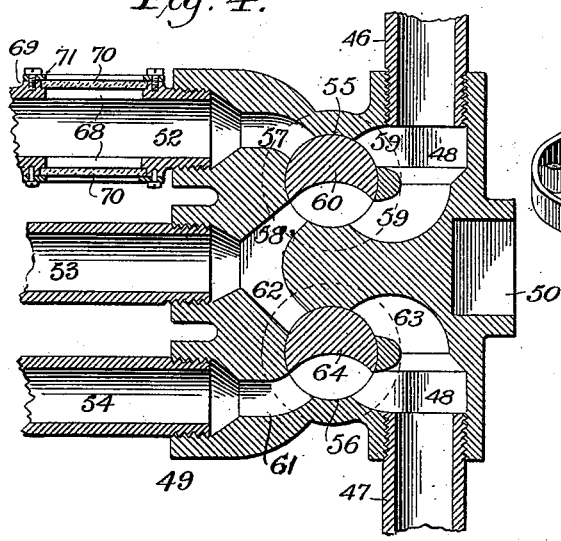
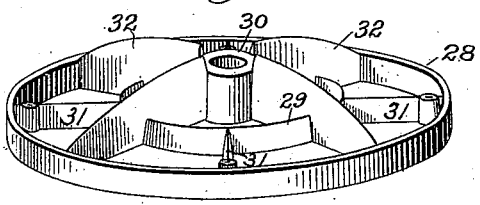
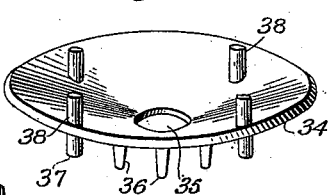
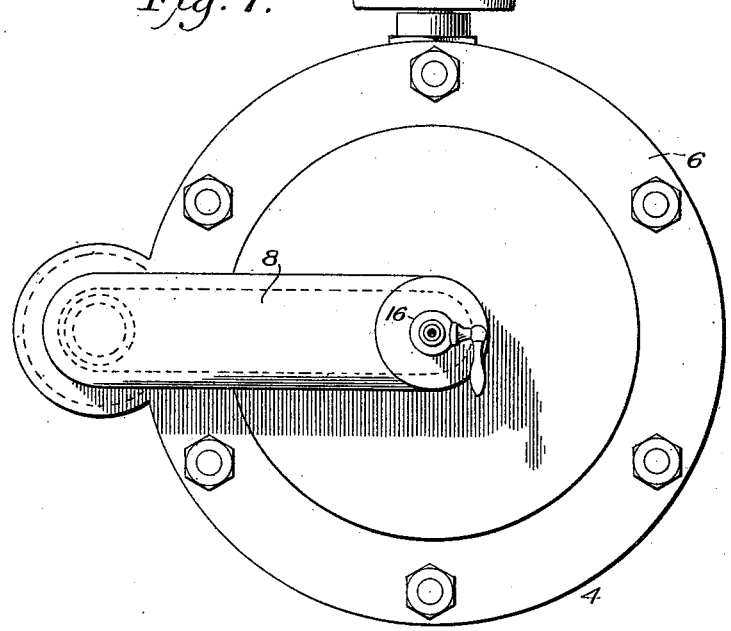
Witnesses
James F. Duhamel
Victor J. Evans
Inventor,
ZOROASTER F. POTTER,
by John Wedderburn
Attorney
THE NORRIS PETERS CO., PHOTO-LITHO., WASHINGTON, D. C.

UNITED STATES PATENT OFFICE.

ZOROASTER FRANKLIN POTTER, OF BALTIMORE, MARYLAND, ASSIGNOR TO THE BALTIMORE FILTER COMPANY, OF SAME PLACE.

FILTER.

SPECIFICATION forming part of Letters Patent No. 619,838, dated February 21, 1899.

Application filed July 26, 1897. Renewed January 20, 1899. Serial No. 702,847. (No model.)

*To all whom it may concern:*

Be it known that I, ZOROASTER FRANKLIN POTTER, a citizen of the United States, residing at Baltimore city, in the State of Maryland, have invented certain new and useful Improvements in Filters; and I do hereby declare the following to be a full, clear, and exact description of the invention, such as will enable others skilled in the art to which it appertains to make and use the same.

This invention has reference to a novel construction in filters, and has for its object to provide a filter that is comparatively inexpensive and durable in construction, that is so constructed that it can be readily flushed out and scoured either with filtered water or with the water from the supply-pipe, in which the water can be made to pass by the filter without passing through the same and without interrupting any of the connections, in providing a device for removing the main portions of the filter to clean the interior of the filtering-bed as occasion may require, and in providing devices for depositing upon the filter-bed a layer or film of oxid of iron for the purpose of destroying the bacilli in the water.

To these and other useful ends the invention consists in the features of construction hereinafter fully described and specifically claimed.

Figure 1:
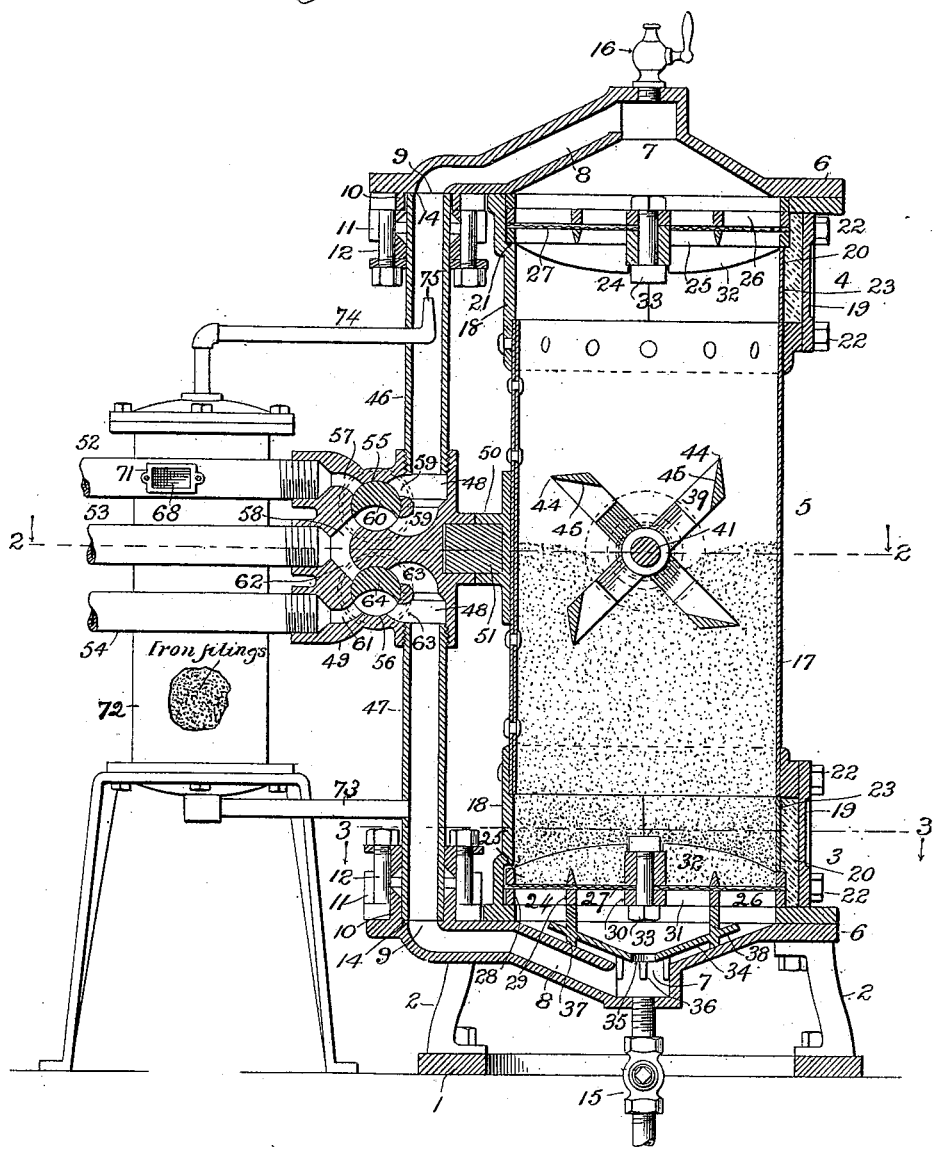
Figure 2:
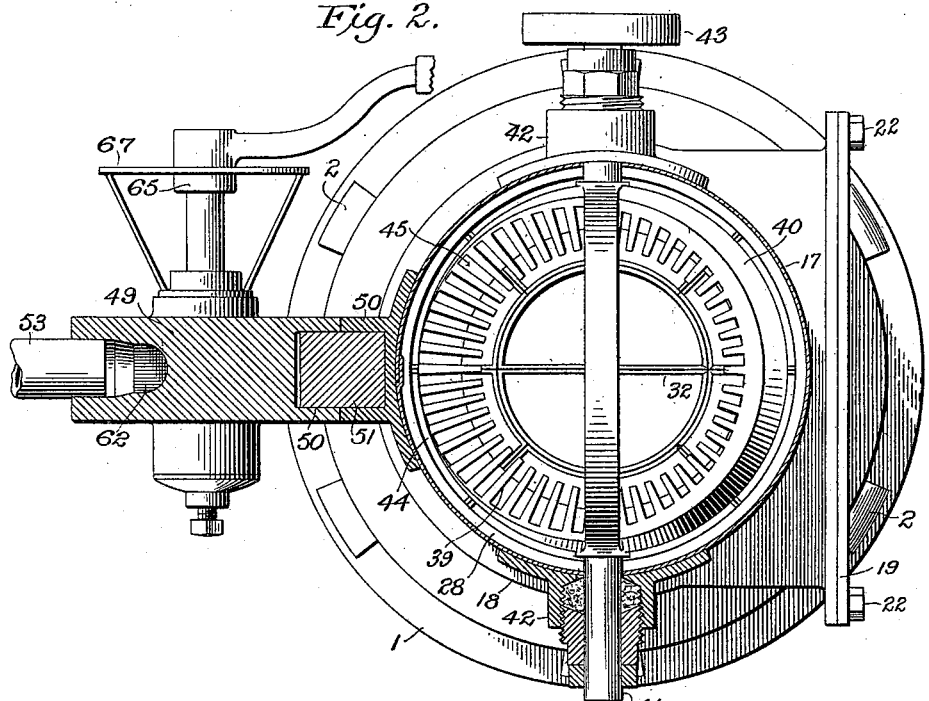
Figure 3:
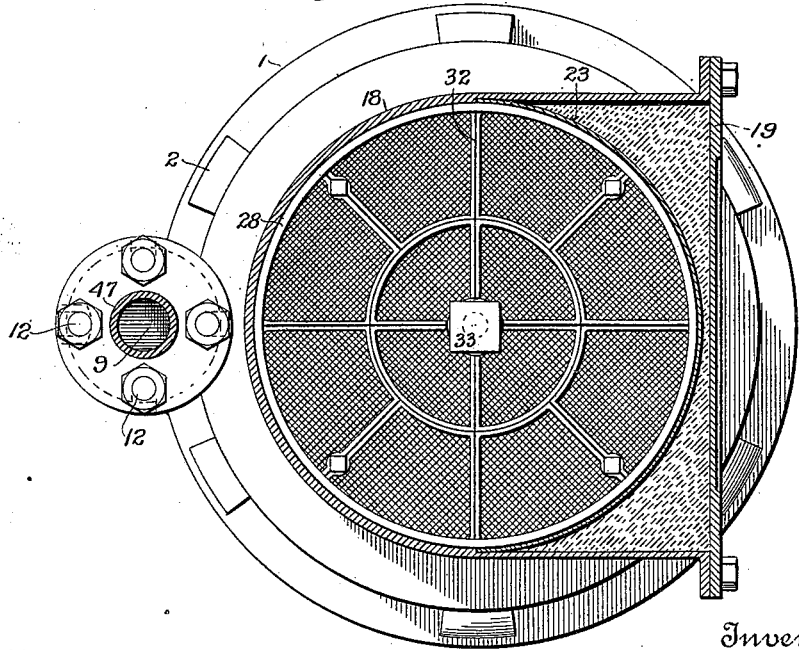

In the accompanying drawings, forming a part of the specification, Figure 1 is a central vertical section of a filter constructed in accordance with this invention. Fig. 2 is a horizontal section on the line 2 2 of Fig. 1 with the filtering-bed removed. Fig. 3 is a horizontal section taken on the line 3 3 of Fig. 1. Fig. 4 is a fragmental vertical section taken on an enlarged scale and illustrating the valves for controlling the supply and outlet of the water and which shows the different ways in which the course of the water can be controlled. Fig. 5 is a perspective view of the upper frame of the grate. Fig. 6 is a perspective view of the distributing-plate. Fig. 7 is a top plan view of the filter.

Referring now to said drawings, 1 indicates the base-plate, upon which the filter is mounted and supported by means of the legs 2. The said filter consists of a bottom or outlet portion 3, a top or inlet portion 4, and an intermediate or filtering portion 5. The bottom or outlet portion 3 and the top or inlet portion 4 are similar in construction, except in so far as they differ in regard to the distributing-plate, and the said bottom or outlet portion is constructed in the following manner: A head 6 rests upon the said feet 2 and is suitably secured thereto. The said head has a flat outer portion, preferably circular, and is inclined inward toward the center, approximating a frustum of a cone, at which point there is an opening 7 for the outlet of the filtered water in filtering and for the inlet in flushing. On the outside of the head and leading from said opening is a passage or duct 8, conveniently cast integral with said head and which leads to one side of the flat portion of said head, where it ends in an upwardly-opening port 9. Around said port is a circular flange 10, forming one part of the stuffing-boxes, and said flange is notched at intervals, as shown at 11, to receive the bolts 12, by means of which the packing-gland of the stuffing-box can be secured thereto, it being noted that there is an upwardly-facing shoulder 14 around the port 9 and extending inwardly to the flange 10. In the passage or duct 8, directly below the opening 7 in the head, is a valve drain-pipe 15, by means of which all of the water contained within the filter can be removed. The upper or inlet end of the filter, as before stated, is similar in construction to the lower or outlet end, and the head at the upper end is constructed in the same manner as before described with relation to the head 6, and the said parts are indicated by the same numerals of reference. The cock 16 upon the upper head is not a drain-cock like the one on the lower head, but is for the purpose of allowing the air contained within the filter to escape when it is desired to start the operation. Otherwise the head is constructed in the same manner. At the upper and lower ends of the filter are the grates or strainers, which are immediately supported by the body portion, which consists, essentially, of a cylindrical casing 17, conveniently of boiler-iron, secured at its ends to caps 18, preferably cast, and which caps are provided at one side with openings adapted to be closed by plates 19. The ends of the caps 18 are flanged, so as to rest flat against the flat portion of the head 6 and to be bolted thereto. The portion of the caps receiving the ends of the casing 17 are cylindrical, and said casing and caps are conveniently riveted together in the familiar manner, while at one side of the caps is an opening 20, that extends half-way around the caps and is made by extending a portion of the sides of the cap at a tangent, commencing from opposite sides. In proximity to its outer end the said cap is provided with an annular groove 21 on its face, the end of said groove being on a level with the end of the opening 20. The outer end of the opening 20 is closed by the plate 19, which is suitably bolted thereto by means of the bolts 22, and when the filter is in use the opening in the side of the cap is further closed by means of a semicircular plate 23, that fits within the opening therein and which completes the interior cylindrical conformation of said cap. To hold said plate rigidly in place and to afford a firm backing, any suitable filling is placed in the rear of the same and between said plate 23 and plate 19—for instance, cement—which, it will be seen, makes the cap practically a solid piece. The purpose of this is to strengthen said cap to withstand the pressure due to the water that is being filtered.

The strainers or grates (indicated as a whole by 24) consists, essentially, of three parts—namely, an inner brace-grate 25, an outer flat grate 26, and an interposed strainer or sieve 27. The said stainer or sieve 27 is situated between the grates, and said grates are bolted firmly together to hold the parts rigidly in position. The grates are circular and each consists of an outer ring 28, an inner ring 29, a central hub or boss 30, and the radial spokes 31. The upper edges of the radial spokes and the inner ring of the grate 25 of the lower strainer or grate and the lower edges of the same parts of the upper strainer or grate are beveled or sharpened, so as not to obstruct the passage of the water or to present surfaces for the accumulation of impurities or other matter, while the said inner grates 25 are each provided with a radial strengthening cross-piece 32, connected also with the bosses or hubs 30 and through which a bolt 33 extends, which afford additional means for securing the said frames together. These frames fit within the interior grooves 21 of the cap 18 and are held in place thereby, it being noted that the said complete grates or strainers can be conveniently inserted when the plates 19 and 23 are removed, it being noted that the plate 23 rests upon the outer ring 21 of the inner frame of each of the grates.

Between the grate or strainer 24 and the lower head 26 is a distributing-plate 34, which is cone-shaped and extends outwardly near the sides of the cap and is provided centrally with an opening 35. Near the center of said plate 34 and surrounding the opening 35 are a plurality of depending fingers 36, that fit within the port or opening 7 in the head 6 and which serve to center the said distributing-plate. Said distributing-plate rests upon the inner face of the head and is supported by means of a plurality of feet 37, which serve to keep the plate above the head to permit the passage of water between these parts. To keep the plate from rising, it is provided on its upper face with upright fingers 38, situated below the inner ring 29 of the strainer-frame. It will be seen, therefore, that by reason of the depending fingers 36, the feet 37, and the upright fingers 38 said distributing-plate is securely held in the desired position. This distributing-plate serves to throw the water outward toward the wall of the casing or cylinder when the flow is reversed, and thus prevents the full force of the water from being exerted upward through the center of the filtering-bed, the central opening 35 being sufficient to permit the passage of the required amount through the center of the bed. The result is that the filtering-bed instead of being packed and made to adhere to the walls of the casing is forced off of the same and upward to be acted upon by the scouring device.

The filtering-bed, which can be composed of any approved filtering material, is placed within the casing and rests upon the lower grate or strainer 24 and extends upwardly about half-way to the upper end of the casing. Mounted within the body portion of the casing is a plow adapted to agitate or loosen up the filtering-bed and which is circular and provided with inwardly-extending teeth 39. The plow is composed of outer rings 40, from the inner edges of which the teeth 39 extend inwardly, while said plow is slightly less than the diameter of the casing and is mounted upon the shaft 41, mounted in stuffing-boxes 42 in the sides of the casing. At one end the shaft is provided with pulleys 43 for the purpose of rotating the same, and as a further improvement in said plow the rings 40 of the plow are provided with sharpened edges 44, that are in front when the plow is rotated, and a wide rear edge, so that when the plow is rotated a certain amount of suction takes place, that serves to effectually lift the mass forming the filtering-bed. The outer and inner sides of the rings 40 are located at an angle to each other, while the inner faces 45 of the rings are located at inclines to the planes of said rings, whereby in rotation the plow serves not only to pass through and separate the filtering-bed, but also serves to lift the material composing the same and direct it inwardly to thoroughly displace and change the formation of the mass, and thus provide for the maximum in cleaning.

The stuffing-boxes at the port 9 of the head receive the ends of the pipes 46 and 47, the former communicating with the port of the upper head and the latter with that of the lower head. These pipes 46 and 47 communicate at their inner ends with the ports 48 of the valve-casing 49, having a screw-threaded connection therewith. The valve-casing 49 is further supported upon the casing 17 of the filter, said casing and valve-casing being provided with oppositely-situated sockets 50, in which is situated a block 51 in the manner shown.

It will be seen from the foregoing description that by means of the stuffing-boxes between the ends of the pipes 46 and 47 and the heads of the casing the connections between these parts are always maintained in a water-tight condition and against liability of injury or damage owing to variation in temperature.

The feed-pipe 46 and the filtered-water pipe 47 lead from one side of the valve-casing, while communicating with the opposite side are three pipes—namely, a flush-pipe 52, a supply-pipe 53, and an outlet-pipe 54. Said valve-casing 49 is provided with two valve-chambers 55 and 56. Each of these valve-chambers is provided with four ports. For instance, the valve-chamber 55 is provided with one port 57, leading to the flush-pipe, another port 58, leading to the supply-pipe, and two ports 59, leading to the port 48, communicating with the feed-pipe 46. These ports 57, 58, and 59 are disposed at equal distances around the valve-chamber, and the valve 60 therein is arranged so that it can establish communication between two adjacent ports only at the same time, while it closes the two remaining ports. The valve-chamber 56 is provided with a port 61, leading to the outlet-pipe 54, a port 62, leading to the supply or inlet pipe and communicating with the port 58 of the other valve-casing, which leads also to the said supply or inlet pipe, and two ports 63, communicating with the port 48, leading to the filtered-water pipe. These ports are also arranged in the same manner as described with relation to the ports of the other valve-casing, and the valve 64 is likewise similarly arranged. The valve 60 is provided with a handle 65, while the valve 64 should be likewise provided. Mounted upon the valve-casing 49 is a dial 67, situated adjacent to the handle 65, and another should be provided adjacent to the handle 66 to show the position of either of the valves, as will be obvious.

The flush-pipe 52 is provided with a sight-opening comprising sections of glass situated at opposite sides thereof and through which the condition of the water passing therethrough can be observed. The particular construction comprises two opening 68, oppositely located and having a surrounding rabbet 69 to receive a piece of glass 70, which is held in place by a sash 71, bolted to the pipe 52, it being understood, of course, that suitable water-tight packing is inserted between the parts.

The parts being constructed and arranged as above described, the operation is as follows: The pipe 52 leads to any suitable place of delivery—for instance, a waste-pipe—the pipe 53 communicates with the supply-pipe, and the pipe 54 to the place where it is desired to deliver the filtered water. To supply filtered water, the valve 60 is turned to establish communication between port 58 and port 59, while the valve 64 is turned to establish communication between port 63 and port 61. The cock 16 is opened to allow the air to escape and is closed as soon as water runs therefrom. It is seen now that the water entering through the inlet-pipe 53 passes through the port 58, the valve 60, the port 59, the port 48, the feed-pipe 46, through the head and into the upper end of the filter, through the strainer and filter-bed to the lower strainer, and then outwardly into the filtered-water pipe 47, and through the ports 48 and 63, the valve 64, and the port 61 into the outlet-pipe 54. In flushing the filter the valve 64 is turned to establish communication between the ports 62 and 63, while the valve 60 is turned to establish communication between the ports 57 and 59. Then the water passes from the supply-pipe downwardly and into the lower end of the filter, up through the filtering-bed, and out through the outer end and into the flush-pipe, as is obvious, it being noted that the plow is rotated while the flushing is taking place to loosen up the filter-bed for obvious reasons. In case several filters are arranged in gangs and it is desired to flush the filter with filtered water the valve 64 is turned to establish communication between ports 61 and 63, while the flush-pipe valve is turned to establish communication between ports 57 and 59. The pressure of the supply being removed from the filter, the pressure upon the filtered water from the other will drive the said filtered water downwardly into the filtered-water pipe, into the lower end of the filter, through the bed, and then out through the flushing-pipe. If it is desired, for instance, to cut the filter off entirely from the supply and allow the water to pass into the filtered-water pipe 54 without passing through the filter, the valve 60 is turned to close the ports 57 and 58 and the valve 64 is turned to establish communication between the ports 61 and 62, whereby it is seen that the water simply enters the pipe 53 and passes through the ports 61 and 62 into the outlet-pipe 54.

The manner of flushing above described is suitable for the ordinary cleaning of the filter while in use; but it is understood that at certain intervals the interior should be cleaned out, and this is accomplished by removing the plates 19 and then the backing and plate 23, so that the filter-bed, as well as all the interior parts of the filter, can be removed for the purpose of renewing or thoroughly cleaning the device and without disturbing the water connections.

In connection with the filter a device is employed for depositing a layer or film of oxid of iron upon the filter-bed, through which the water must pass in the filtering operation and which serves to effectually arrest and destroy the bacilli carried by the water. For this purpose a cylinder 72 is employed that is suitably supported adjacent to the filter and which is provided at its lower end with a pipe 73, that communicates at its other end with the pipe 47, leading from the lower end of the filter. From the upper end of the cylinder 72 extends another pipe 74, that communicates with the pipe 46, leading to the upper end of the cylinder. The end of the pipe 74 extends into the pipe 46 and extends upward or in the direction of the current of water and is provided with a small end or nozzle 75, it being noted that in this way a current of water is maintained through the cylinder 72, and the latter is filled with iron filings or other small particles of iron, so that by chemical action oxid of iron is introduced into the water which is deposited upon the filter-bed and forms a layer or film thereon through which the water must pass.

Having thus described my invention, what I claim as new, and desire to secure by Letters Patent, is—

1. A filter comprising a casing having an inlet at its upper end, an outlet at its lower end, a strainer between the inlet and the body of its casing, a strainer between the outlet and the body of the casing, a filter-bed resting upon said strainer, a movable plow within said casing for the purpose of disturbing the filter-bed mass, a deflecting-plate between the outlet and the adjacent strainer, an inlet or supply pipe, an outlet-pipe for filtered water, a flush-pipe, and means for establishing communication between the inlet of the casing and the supply or inlet pipe and the flush-pipe, and between the outlet of the casing and said supply or inlet pipe and the outlet or filtered-water pipe and between the supply or inlet pipe and the outlet or filtered-water pipe, substantially as described.

2. In a filter, an upright casing having heads at the ends thereof and an opening in the center of each of said heads communicating by means of ducts with supply and outlet pipes and strainers, and a filter-bed situated between said heads, and a deflecting-plate between one of said openings and the adjacent strainer and having a central opening, substantially as and for the purpose specified.

3. In a filter, an upright casing having heads at the ends thereof said heads extending outwardly and being cone-shaped to provide inclined walls a central opening in said heads communicating by means of ducts with supply and outlet pipes, a filter-bed situated between said heads, and a deflecting-plate held at a distance from one of said heads and between the same and the adjacent strainer and having an opening, substantially as and for the purpose specified.

4. In a filter, an upright casing having heads at the opposite ends thereof, said heads being cone-shaped and having central openings communicating with ducts leading to supply and outlet pipes, a drain-pipe at the lower end of the lower head, a cock at the upper end of the upper head a horizontal shaft supported in the walls of the casing and a rotatable scourer fixedly mounted on said shaft, as set forth.

5. In a filter, a casing having caps at the ends thereof, heads at the ends of said caps, an inlet and an outlet in the opposite heads, an opening in each of said caps and interior grooves in said caps adjacent said openings, strainers situated within said grooves, curved plates closing the inner ends of said openings in the caps, plates closing the outer ends of said openings in the caps, and packings between said plates, substantially as described.

6. In a filter, a strainer comprising two gratings or frames and an interposed sieve or reticulated plate, said strainers being securely fastened together and comprising outer and inner rings and radial spokes, the rings and spokes of one of said frames having beveled or sharpened inner edges, substantially as described.

7. In a filter, a strainer comprising two frames or grates and an interposed sieve or reticulated plate, said parts being securely fastened together, said frames consisting of outer and inner rings and radial spokes, while one of said frames is provided on its inner side with radial strengthening-ribs, and bosses or hubs at the center of said frames or grates to receive a center bolt for securing said frames or grates together, substantially as described.

8. In a filter, a casing, a shaft supported in the side walls thereof and disposed transversely of the length thereof, and a rotatable plow rigidly mounted on said shaft to revolve within the filter-bed, substantially as described.

9. In a filter, a casing provided with a shaft mounted in stuffing-boxes on the sides of said casing, means for rotating said shaft, and a plow fixedly carried by said shaft and situated within the casing, substantially as described.

10. In a filter, a casing provided with a rotatable shaft extending therethrough, and a plow carried by said shaft and comprising an outer ring having a tapered front edge and inwardly-projecting teeth, substantially as described.

11. In a filter, a casing provided with a rotatable shaft and a plow carried by said shaft within the casing and comprising a ring having a tapered front edge and an inclined inner face, and a plurality of inwardly-projecting teeth, substantially as described.

12. In a filter, a casing provided with a rotatable shaft and a plow carried by said shaft within the casing and comprising a ring having a tapered front edge, an inclined inner face and an extended or widened rear head, and a plurality of inwardly-projecting teeth, substantially as described.

13. In a filter, a casing having a head at the lower end thereof provided with a central opening, a strainer extending across said end of the casing, and a distributing-plate situated between said head and said casing and provided with a central opening, the diameter of said distributing-plate being less than the inner diameter of the casing, substantially as described.

14. In a filter, a casing provided with a conical lower head having a central opening, and a conical distributing-plate provided with a central opening and with feet upon its lower face resting upon said conical head, substantially as described.

15. In a filter, a casing provided at its lower end with a head having a central opening, a distributing-plate of less diameter than said head provided with a central opening, depending fingers surrounding said central opening in the distributing-plate and adapted to enter the opening in said head, and feet upon the lower end of said distributing-plate to rest upon said head, substantially as described.

16. In a filter, a casing having a head at its lower end provided with a central opening, a strainer situated above said opening, a distributing-plate having a central opening and feet upon its lower face to rest upon said head, and uprising feet upon the upper face of said distributing-plate to come in contact with the lower face of said strainer, substantially as described.

17. In a filter, an upright casing having inlet and outlet ports at the ends thereof, pipes communicating with said inlet and outlet ports and with an interposed valve-casing, and stuffing-boxes for forming the connection between said pipes and said ports, substantially as described.

18. In a filter, the heads at the ends of the casing provided with oppositely-situated inwardly-facing ports, flanges surrounding said ports and forming one part of the stuffing-boxes, shoulders between said flanges and said ports, notches within said flanges, pipes communicating at their inner ends with a valve-casing and connected with the ports at their outer ends by means of packing-glands held in position by means of headed bolts secured within the notches of said flanges, substantially as described.

19. In a filter, the two pipes leading to the opposite ends of the casing and communicating at their inner ends with a valve-casing, three pipes leading through said valve-casing, and two valve-chambers provided with valves, each of said valve-chambers having four ports two of which communicate with one of the pipes leading to the end of the casing, while the other two communicate with two of said other pipes, while said valves are adapted to establish communication between two adjacent ports and to close the remaining ports in each valve-chamber, substantially as described.

20. In a filter, the two pipes leading to the opposite ends of the filter, and a valve-casing provided with two valve-chambers, each of which is provided with four ports, two adjacent ports of which communicate with one of said pipes, two of said pipes leading to the ends of the casing, three other pipes leading to said valve-casing, one of which communicates with one port of each of said valve-chambers, while the other two pipes communicate with one port each, and a valve within each of said valve-chambers which is adapted to establish communication between two adjacent ports of the valve-chamber and to close the remaining ports, substantially as described.

21. In a filter, a casing provided with a lower head with central opening, and a distributing-plate having a central opening in line with that of the head and supported at a distance above said head to form a means of causing the liquid to be thrown outward toward the wall of the casing after it passes through the opening in the said head, substantially as and for the purpose specified.

22. In a filter, a casing having heads and an opening near one end, combined with a curved plate closing the inner end of said opening, a plate closing the outer end of said opening, and means for securing said plates and forming a water-tight joint between them, substantially as shown and described.

23. The combination with a filter having a filtering-bed and an inlet and an outlet therefor, of a receptacle communicating at its opposite ends with the inlet and outlet of the filter, and adapted to receive small pieces of iron or the like, substantially as described.

24. The combination with a filter having a filtering-bed and an inlet and an outlet, of a receptacle communicating at its lower end with said outlet and at its upper end with said inlet, the pipe for establishing communication with the inlet having a nozzle situated within the inlet and extending toward the filter, said receptacle adapted to receive small particles of iron, substantially as described.

25. The herein-described process of filtering water, which consists in passing filtered water through an iron mass and introducing the oxid filtrate to the filtering-chamber-supply pipe and depositing upon the filter-bed a layer or film of oxid of iron, substantially as specified.

In testimony whereof I have signed this specification in the presence of two subscribing witnesses.

ZOROASTER FRANKLIN POTTER.

Witnesses:
HARRY HARDWICK,
G. E. TEEPLE.